US011851855B2

(12) United States Patent
Messerschmidt et al.

(10) Patent No.: US 11,851,855 B2
(45) Date of Patent: Dec. 26, 2023

(54) DRAINAGE SYSTEM AND DRAIN

(71) Applicant: ACO SEVERIN AHLMANN GMBH & CO KOMMANDITGESELLSCHAFT, Büdelsdorf (DE)

(72) Inventors: Heino Messerschmidt, Lütjenwestedt (DE); Brunhild Schmidtke, Hohn (DE)

(73) Assignee: ACO AHLMANN SE & CO. KG, Budelsdorf (DE)

( * ) Notice: Subject to any disclaimer, the term of this patent is extended or adjusted under 35 U.S.C. 154(b) by 397 days.

(21) Appl. No.: 17/292,195

(22) PCT Filed: Nov. 6, 2019

(86) PCT No.: PCT/EP2019/080414
§ 371 (c)(1),
(2) Date: May 7, 2021

(87) PCT Pub. No.: WO2020/099216
PCT Pub. Date: May 22, 2020

(65) Prior Publication Data
US 2021/0388581 A1 Dec. 16, 2021

(30) Foreign Application Priority Data

Nov. 13, 2018 (DE) ..................... 10 2018 128 443.8

(51) Int. Cl.
*E03B 3/02* (2006.01)
*E03B 1/04* (2006.01)
(Continued)

(52) U.S. Cl.
CPC .............. *E03B 1/042* (2013.01); *E03B 1/041* (2013.01); *E03F 1/005* (2013.01); *E03F 7/04* (2013.01); *E03B 2001/047* (2013.01)

(58) Field of Classification Search
CPC .. E03F 1/005; E03F 1/00; E03F 1/003; E03B 2001/047; E03B 1/041; E03B 1/04
See application file for complete search history.

(56) References Cited

U.S. PATENT DOCUMENTS

2011/0174706 A1* 7/2011 Russell .................. A01G 25/00
405/36
2011/0308618 A1* 12/2011 Lorenz .................... E03B 1/042
137/1

(Continued)

FOREIGN PATENT DOCUMENTS

CN      203530058        * 11/2013
CN      104790463 A        7/2015
(Continued)

OTHER PUBLICATIONS

An Office Action issued in the corresponding Chinese Application No. 201980074496.8; dated Mar. 18, 2022.

*Primary Examiner* — Sean D Andrish
(74) *Attorney, Agent, or Firm* — Pearne & Gordon LLP

(57) ABSTRACT

Drainage systems are limited in performance and difficult to maintain. A drainage system is therefore specified, comprising at least one infiltration device (10, 40) adapted to receive fluid; a collecting device (30) which is in fluid communication with the at least one infiltration device (10, 40) and is adapted to receive fluid from the at least one infiltration device (10, 40) and to discharge it to a fluid system (4), wherein a gateway device (52) is provided, which is adapted to receive and transmit sensor data to a receiving unit (60); and at least one sensor (6, 6', 7, 11, 11', 14, 31, 31', 32, 33, 41, 44, 42, 45) is provided, which is communicatively connected to the gateway device (52) for providing sensor data.

15 Claims, 2 Drawing Sheets

(51) Int. Cl.
*E03F 1/00* (2006.01)
*E03F 7/04* (2006.01)

(56) References Cited

U.S. PATENT DOCUMENTS

| | | | |
|---|---|---|---|
| 2012/0255624 A1* | 10/2012 | Canney | E03F 1/002 |
| | | | 137/315.01 |
| 2015/0001162 A1 | 1/2015 | Dannrup et al. | |
| 2016/0115675 A1* | 4/2016 | Quigley | E03B 1/042 |
| | | | 700/282 |
| 2017/0294101 A1* | 10/2017 | Stettler | G01W 1/14 |
| 2017/0348620 A1* | 12/2017 | Rastegar | C02F 1/44 |
| 2018/0054662 A1 | 2/2018 | Petrachek et al. | |

FOREIGN PATENT DOCUMENTS

| | | |
|---|---|---|
| CN | 106400924 A | 2/2017 |
| DE | 102007030305 A1 | 11/2008 |
| DE | 102008049297 A1 | 5/2010 |
| EP | 1371790 A1 | 12/2003 |
| EP | 1764446 A1 | 3/2007 |
| KR | 20090092864 * | 9/2009 |
| KR | 20110139019 | 12/2011 |
| WO | 2006114621 A1 | 11/2006 |
| WO | 2009101597 A2 | 8/2009 |
| WO | 2015035444 A1 | 3/2015 |
| WO | 2015187749 A1 | 12/2015 |
| WO | 2017089181 A1 | 6/2017 |

\* cited by examiner

DRAINAGE SYSTEM AND DRAIN

TECHNICAL FIELD OF THE INVENTION

The invention relates to a drainage system and a drain.

PRIOR ART

The sealing of surfaces has a significant impact on the groundwater balance. In addition, surface water and rainwater runoff must be drained off and fed into wastewater treatment plants. A particular challenge arises during heavy rainfall events, which can lead to flooding with major damage in urban areas. Especially in such extreme situations, it must be ensured that surface water and rainwater can be safely drained.

It is well known to use infiltration devices that allow surface water or rainwater to percolate into the ground. Infiltration devices, for example, drains, are installed in the ground and can absorb large volumes of surface water, which can then run off into the ground.

From EP 1 764 446 A1 it is known to conduct rainwater through a storage trench to be laid underground. In addition, a liquid-permeable distribution device is to be provided underneath the storage trench, the surface area of which is larger than a base area of the storage trench. This is to ensure that the water absorbed by the storage trench is distributed over a large area. Thus, the capacity of the storage trench is increased.

However, the solution described above has the disadvantage that a large area has to be worked on in terms of civil engineering in order to install the distribution device. In addition, the performance of the distribution device is also limited, so flooding can occur during very heavy rainfall. In addition, the distribution device can be damaged during installation, and damage cannot be easily detected and maintenance is costly.

SUMMARY OF THE INVENTION

It is therefore the object of the invention to effectively prevent flooding during heavy rain events. In particular, it is the object of the invention to increase the effectiveness of infiltration systems. It is further particularly the object of the invention to simplify and improve the maintenance of drainage systems. In particular, it should be possible to detect problems in the drainage system at an early stage.

This object is solved by
a drainage system, comprising:
at least one infiltration device adapted to receive fluid;
a collecting device which is in fluid communication with the at least one infiltration device and is adapted to receive fluid from the at least one infiltration device and to discharge it to a fluid system.

A gateway device is provided, which is adapted to receive sensor data and transmit it to a receiving unit, in particular a server device.

Furthermore, at least one sensor communicatively connected to the gateway device, in particular an environmental sensor, is provided for outputting sensor data.

A core of the invention is that a multi-stage drainage system is disclosed in which fluid can be passed to a collecting device when an infiltration device is at capacity. Another core of the invention is that in such a multi-stage drainage system, sensor data is collected and sent to a receiving device or a server device. Thus, the characteristics of the drainage system can be monitored at any time.

For example, a sensor, e.g., an environmental sensor, may be a temperature sensor, a sediment sensor, a flow sensor, a water-level sensor, a salinity sensor, a rainfall sensor, and/or a humidity sensor. Environmental sensors in the sense of the invention can also be other sensors, e.g. sensors for determining location, position, voltage or sensors for data coupling, etc. It is conceivable to use a wide variety of types of sensors.

It is therefore possible to record a variety of different sensor data to ensure comprehensive monitoring of the drainage system. In particular, the recorded sensor data can be used to identify a rain hotspot, i.e. an area in which a particularly large amount of rain falls. It is also possible to identify the points in the system where particularly large amounts of water collect. This makes it possible to initiate targeted measures to improve the system status.

In one embodiment, the at least one sensor may be configured to determine and/or output the sensor data at a substantially constant frequency.

A substantially constant frequency, in the context of this application, means a frequency that is constant minus a measurement uncertainty. A measurement inaccuracy may comprise less than 10 percent, preferably less than 5 percent, and more preferably less than 1 percent of the underlying time interval.

The at least one sensor may thus be configured to determine sensor data at uniform time intervals. For example, the time interval may comprise less than or equal to one day, less than or equal to half a day, less than or equal to one hour, less than or equal to 30 minutes, less than or equal to one minute, less than or equal to 30 seconds, or less than or equal to 1 second.

This makes it possible to operate the at least one sensor in a particularly energy-efficient manner. The choice of the frequency can be sensor-specific, because different environmental influences change slower and other environmental influences change faster. This means that the frequency with which sensor data is determined and/or emitted by the at least one sensor can be determined taking into account environmental influences.

In one embodiment, the at least one sensor may be configured to switch between an idle phase and an active phase, wherein determining and/or emitting may be performed only in the active phase.

Switching between an idle phase and an active phase can further save energy and reduce the duration between battery changes. It is further possible for sensor data to be output only every second active phase or every third active phase. For intermediate storage, the at least one sensor may comprise a memory device. Thus, energy can be further saved, since the output of sensor data is energy-intensive. In one embodiment, the at least one sensor may be communicatively connected to the gateway device via a wireless connection. For example, the gateway device and the at least one sensor may be communicatively connected via a NarrowBand IoT, a Bluetooth Low Energy connection, or a Long Range Wide Area Network connection. In one embodiment, the at least one sensor may be connected to the gateway device via a wired connection. For example, an Ethernet connection may be provided.

The at least one sensor and the gateway device may be arranged in a star-shaped network topology. In one embodiment, the gateway device may comprise a SIM card and/or a SIM module for communication with the server device.

The at least one sensor or environmental sensor can have a communication device for outputting the sensor data, which can be designed for wireless and/or wired transmission of the sensor data.

In one embodiment, the at least one sensor may be arranged in the at least one infiltration device and/or in the collecting device, in particular at least partially in a maintenance shaft of the at least one infiltration device and/or the collecting device.

With the described embodiment, it becomes possible to monitor the interior of the infiltration device and/or the collecting device. Thus, for example, it can be determined whether water is no longer flowing out or whether water can no longer enter.

In one embodiment, the at least one infiltration device may include a first temperature sensor and the collecting device may include a second temperature sensor, wherein the infiltration device and the collecting device may be arranged at different depth levels with respect to a ground level.

By using the described embodiment, the soil temperature can be measured at different depth levels. Furthermore, it is possible to measure the temperature of water at different depth levels. This is particularly advantageous in winter, as it can be determined how deep soil frost reaches.

In one embodiment, the at least one sensor may be configured as a sediment sensor, particularly an ultrasonic sensor, for detecting sediment in the at least one infiltration device.

By providing a sediment sensor to detect sediment in the at least one infiltration device, it can be determined when the infiltration device can no longer perform its function. This provides a simple way to notify a technician that the infiltration device should be flushed. Maintenance of the infiltration device is thus simplified.

In one embodiment, the sediment sensor may be disposed in an access shaft of the at least one infiltration device.

By providing the sediment sensor in an access shaft, a particularly easy maintainability of the sediment sensor is ensured. In addition, installation is simplified. Furthermore, arrangement in an access shaft is advantageous because the entire infiltration device can be monitored from there. For example, an ultrasonic sensor can detect the entire interior of the infiltration device.

In one embodiment, the drainage system may include at least one backwater valve in the collecting device and/or in a fluid system, particularly a wastewater system, for blocking backwater fluid, particularly wastewater.

In the event of very heavy precipitation, it can happen that an overload of the fluid system causes a backwater, so that fluid or wastewater can enter the infiltration device or the collecting device. This is effectively prevented by a backwater valve in the collecting device or in a fluid system.

In one embodiment, the drainage system may comprise at least one drainage device for draining surface water and/or rainwater, which may be in fluid communication with the at least one infiltration device.

A drainage device may be provided in particular at the ground surface. For example, the at least one drainage device can be designed as a water-permeable base plate or as a drainage element, wherein the base plate and/or the drainage element can be designed to accommodate at least one sensor, in particular an environmental sensor, on its surface facing away from the earth.

The drainage element can be designed to provide linear and/or point drainage. For this purpose, point-shaped and/or linear passages can be provided through the drainage element. Rainwater can pass through these passages to provide drainage. In one embodiment, the point-shaped and/or linear passages can run through the drainage element transversely to a ground plane.

A water-permeable base plate or drainage element has the advantage that rainwater can be effectively directed to the infiltration device. Also, no standing rainwater remains on the ground surface. It is particularly advantageous if a sensor, e.g. an environmental sensor, can be attached to the ground plate or drainage element so that further information, for example regarding precipitation, can be recorded by sensor data and transmitted to the gateway device.

In one embodiment, the base plate and/or the drainage element may comprise a sensor receptacle, in particular a through-hole for accommodating a sensor and/or an environmental sensor.

The provision of a through-hole in the base plate is a particularly simple sensor mounting that can be quickly implemented in terms of design. This reduces the manufacturing costs.

In one embodiment, the drainage system may include a server device that may be communicatively connected to the gateway device and may be adapted to receive the sensor data.

A server device may also be understood to be a plurality of different servers, which may be arranged in a data center, for example. The communication between the gateway device and the server device can be carried out via a wireless connection, for example Long Range Wide Area Network. However, it is also conceivable that wired communication is used. For this purpose, the gateway device and the server device may have corresponding communication devices. Various air interfaces, such as LTE, UMTS or GSM, can also be considered as wireless transmission interfaces.

In one embodiment, the server device may comprise a computing device that may be configured to parameterize a simulation model using the sensor data and/or to learn a simulation model.

It is particularly advantageous if the server device parameterizes or learns a simulation model so that the behavior of one and/or a plurality and/or all components of the drainage system, in particular the at least one infiltration device and/or the collecting device, can be determined or predicted. Thereby, an amount of water per time unit can serve as input parameter for the simulation model. The amount of water present in the infiltration device may represent the output of the simulation model. However, it is also conceivable to determine further parameters of the infiltration device or the collecting device as input or as output of the simulation model.

In one embodiment, the simulation model may specify a water level in the at least one infiltration device and/or in the collecting device as a function of a quantity of introduced fluid, in particular wastewater.

The object is further solved in particular by a drain for use in a drainage system comprising
a lower drain element;
an upper drain element;
spacer elements by means of which the lower and upper drain elements can be connected to each other;
wherein at least one sensor arranged on the lower and/or on the upper drain element is provided for outputting sensor data, in particular an environmental sensor.

The modular drain described above has the advantage that a sensor can be integrated directly into it. Fabrication is facilitated by the modular design, as the sensor can thus be easily attached to the drain. Incidentally, this results in a stable construction that is particularly suitable for use in the drainage system as described above.

BRIEF DESCRIPTION OF THE DRAWINGS

In the following, the invention is explained in more detail by means of exemplary embodiments, wherein.

DETAILED DESCRIPTION OF THE INVENTION

In the following, the same reference numbers are used for the same parts or parts with the same effect.

Figure 1:
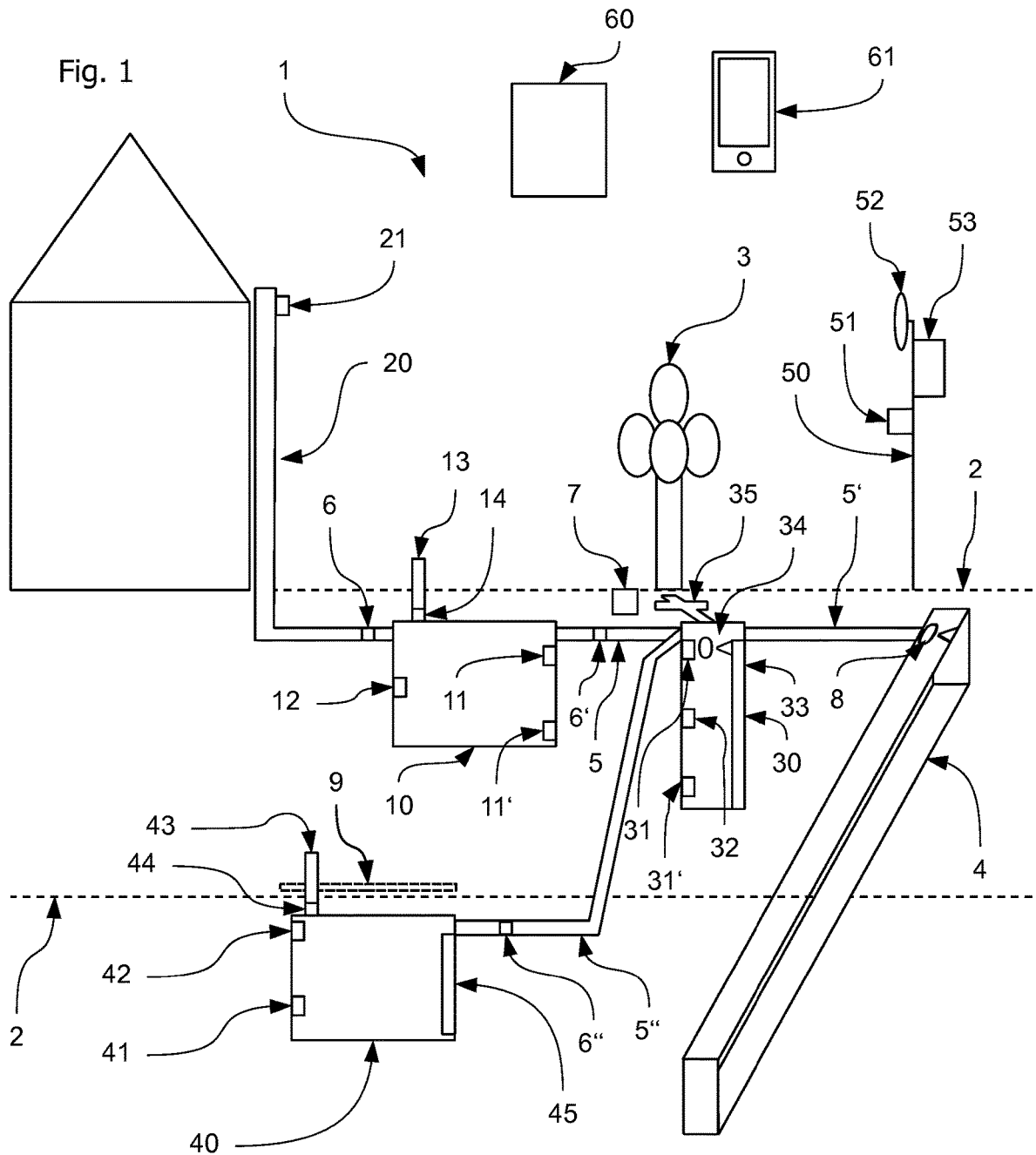
FIG. 1: shows a drainage system in a schematic representation.

FIG. 1 shows a schematic representation of a drainage system 1. When it rains, rainwater is collected by a rain gutter 21 and passed on to a drain body 10 via a rainwater collection pipe 20. A flow sensor 6 is arranged in the rainwater collection pipe 20, which is designed to determine the amount of water flowing through.

The flow sensor 6 is connected via a wireless link to a gateway device 51, which is arranged on an antenna mast 50. Bluetooth low energy is used to transmit sensor data from the flow sensor 6 to the gateway device 51 in the exemplary embodiment shown. The flow sensor 6 is adapted to switch to an active state when rainwater flows through the rainwater collection pipe 20. When no rainwater flows through the rainwater collection pipe 20, the flow sensor 6 switches to a passive state in which no sensor data is determined and output. Thus, the flow sensor 6 is configured to indicate a volumetric flow rate, that is, the volume of water per period of time that flows through the cross-section of the rainwater collection pipe 20.

The drain body 10 is arranged with its upper side about 80 cm below a ground level 2. The drain body 10 comprises temperature sensors 11, 11', a salinity sensor 12 and a sediment sensor 14. The temperature sensors 11, 11' are arranged at different heights of the drain body 10 on the inside of a lateral wall. Thus, a temperature difference between the two temperature sensors 11, 11' can be determined. The salinity sensor 12 is designed to determine the salinity of the water absorbed by the drain body 10.

The drain body 10 can be accessed via a drain maintenance access 13 from above the ground level 2. If debris is deposited in the drain body 10, i.e. sediment is formed, then the drain body 10 can be flushed via the drain maintenance access 13. To determine if sediment is present in the drain body 10, a sediment sensor 14 is provided in the drain maintenance access 13. In the exemplary embodiment shown, the sediment sensor 14 is configured as an ultrasonic sensor 14. The ultrasonic sensor 14 can measure, for example, whether a protective element surrounding the drain body 10, which protects against penetrating soil, is clogged or still permeable to water.

All sensors 11, 11', 12 and 14 of the drain body 10 are designed to output sensor data to the gateway device 51.

When the drain body 10 is filled with water, overflowing water runs through the connecting pipe 5 into a collecting device 30. In the connecting pipe 5, another flow sensor 6' is arranged, which sends sensor data regarding the amount of water flowing through to the gateway device 51.

In the collecting device 30, not only overflowing water of the drain body 10 but also of a drain body 40 is collected.

The drain body 40 is arranged with its upper side approx. 40 cm below the ground level 2. Above the drain body 40, a base plate 9 is provided, which is designed to be permeable to water. Rainwater penetrating through the base plate 9 from above is absorbed by the drain body 40. The drain body 40 also comprises a temperature sensor 41 and a salinity sensor 42. Further, the drain body 40 comprises a sediment sensor 44 disposed in a drain maintenance access 43. Furthermore, the drain body 40 comprises a water-level sensor 45 that determines a current water level in the drain body and transmits it as sensor data to the gateway device 51.

The provision of a salt content sensor 42 in the drain body 40 is advantageous, since in winter sidewalks are often kept free of snow with salt and thus the wastewater has an increased salt content. To avoid overloading the groundwater with salt, the salt content of the water discharged into the ground must be measured regularly.

Overflowing water of the drain body 40 is directed to the collecting device 30 via a connecting pipe 5". Another flow sensor 6" is provided in the connecting pipe 5", which determines a flow rate of water through the connecting pipe 5" and sends it as sensor data to the gateway device 51.

The collecting device 30 comprises a first temperature sensor 31 and a second temperature sensor 31' arranged at different heights on the side wall of the collecting device 30. Furthermore, a salinity sensor 32 is provided, which is provided for determining the salinity of the wastewater collected in the collecting device 30. Furthermore, a water-level sensor 33 is provided which is adapted to determine the water level in the collecting device 30.

Overflowing wastewater from the collecting device 30 is passed on to a wastewater pipe 4 via a connecting pipe 5' and thus fed to a public wastewater system, for example.

In order to prevent a backwater in the wastewater system or in the wastewater pipe 4 during heavy rainfall from causing fecal matter and other wastewater to enter the groundwater, a backwater valve 34 is provided in the collecting device 30 at the opening of the connecting pipe 5', which is designed to close in the event of a backwater in the connecting pipe 5' so that no wastewater from the wastewater pipe 4 can enter the collecting device 30. To increase the safety against backwatering wastewater, another backwater valve 8 is also provided at the end of the wastewater pipe 5' that creates the connection to the wastewater pipe 4.

The collecting device 30 further comprises a soil moistening unit 35 through which wastewater can be delivered to larger plants, such as a tree 3. In the exemplary embodiment shown, a moisture sensor 7 is also provided in the vicinity of the tree 3 to determine a soil moisture content and transmit it as sensor data to the gateway device 51. In one exemplary embodiment, it may be possible to block the soil moistening unit 35 when the soil around the tree 3 is already very moist. For this purpose, a blocking valve can be provided, which can be controlled via an actuator.

On the antenna mast 50, in addition to the gateway device 51 and an antenna 52, a water quantity sensor 53 is provided that is configured to determine a precipitation quantity. The gateway device 51 is communicatively connected to the antenna 52 to transmit the sensor data to the server device 60.

The server device 60 comprises a communication device for receiving the sensor data. Furthermore, the server device 60 comprises a computing device for analyzing and processing the sensor data. Thus, in the illustrated exemplary embodiment, it is provided that the sensor data is used to parameterize or train/learn simulation models. For example, a simulation model may be provided for each of the elements, such as the drain bodies 10, 40 as well as the collecting device 30.

In one exemplary embodiment, a simulation model may be a simple function, such as a polynomial, wherein the parameters of the function, e.g., the degree of the polynomial and/or the coefficients of the polynomial, are determined using the simulation data. In another exemplary embodiment, a simulation model may be an artificial neural network or other classifier.

It is also possible to obtain precise information about the functionality of the drainage system 1. For example, using the water-level sensors 33, 45, it is possible to determine whether individual elements of the drainage system are overloaded. It can also be determined how much water can still be absorbed. Sensor data from the sediment sensors 14, 44 can also be taken into account, since the amount of water that can be absorbed is reduced in the presence of sediment in the collecting device 30 or the drain bodies 10, 40.

The simulation data and/or the simulation model results can be transmitted to a mobile terminal device 61 via a communication device. For this purpose, a web server can be executed on the server 60, via which the mobile terminal device 61 can access the sensor data or the simulation model data. The mobile terminal device 61 may be a smartphone or also a PC, laptop or tablet. It is also provided that an application is executed on the mobile terminal device 61 that accesses the data stored on the server 60 via an API.

Thus, it is possible for a service technician to receive current and predicted data about the drainage system 1 with his smartphone 61 and accordingly initiate appropriate maintenance measures. For this purpose, the sensor data can be displayed in a dashboard that includes a clear presentation of the most important key figures. Furthermore, it is possible that citizens of a city can be informed about possible flooding in a certain area. It is also possible for the server 60 to send alerts to users of mobile terminal devices 61 in the form of push messages, for example, an e-mail, an SMS or some other message.

Figure 2:
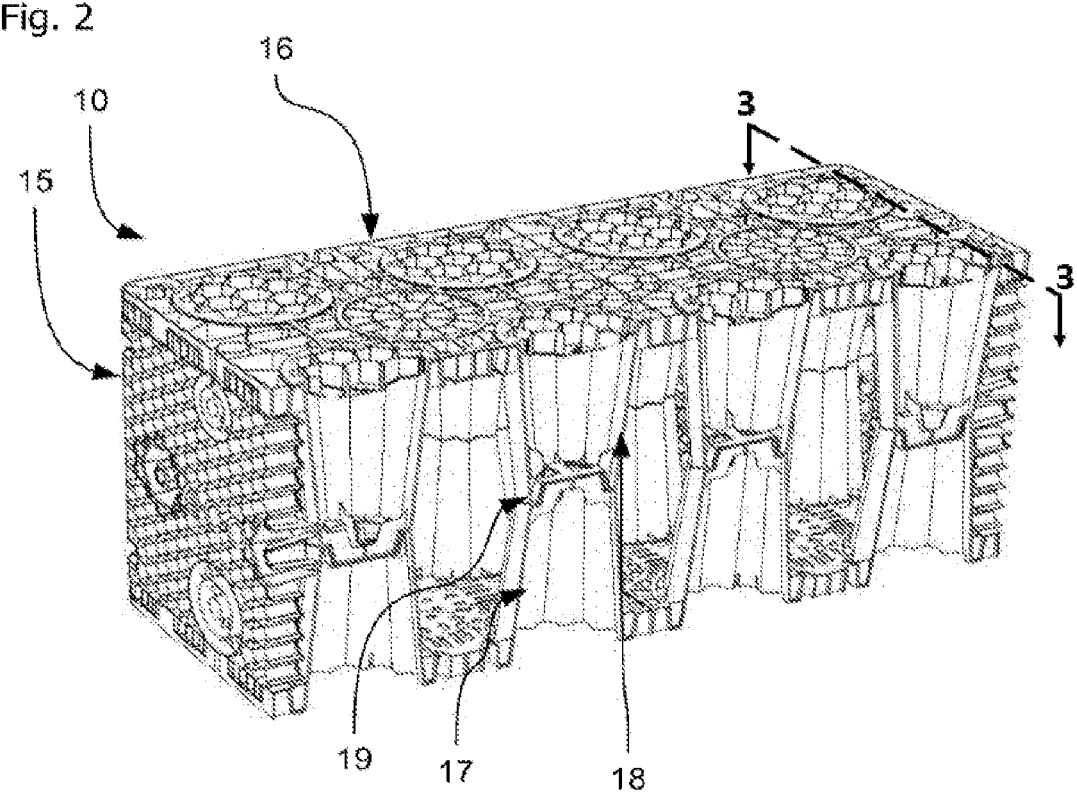
FIG. 2: shows a perspective view of a plurality of drain elements.

FIG. 2 shows a possible drain body 10. In the exemplary embodiment shown, the drain body 10 comprises an upper drain element 18 and a lower drain element 17. The drain elements 17, 18 are of frustoconical design and are stacked on top of each other in mirror image. The drain elements 17, 18 are detachably connected to each other via spacer elements 19. Several drain elements together form a drain body 10, which is bounded, among other things, by drain wall elements 15 and drain ceiling elements 16. In the inserted state, i.e. in the buried state, a water-permeable film, for example a non-woven fabric, is wrapped around the drain body 10 to protect the drain body from penetrating soil.

Figure 3:
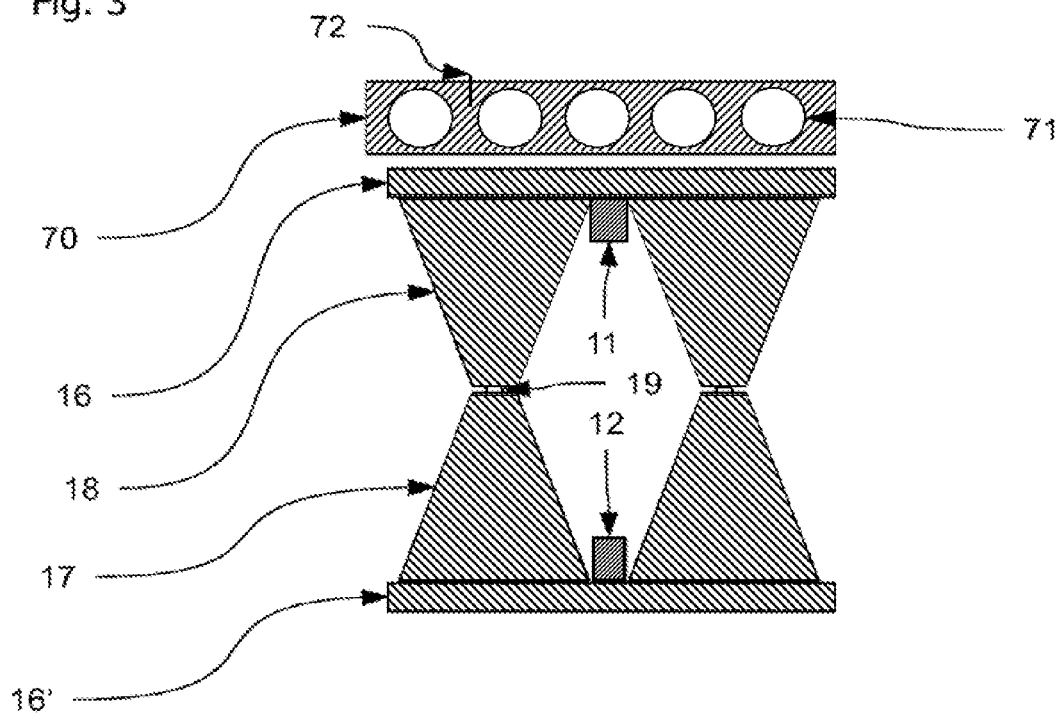
FIG. 3: shows a sectional view of a drain element.

FIG. 3 shows a drain body 10 arranged below a base plate 70. The base plate 70 is designed to be permeable to water. For this purpose, small holes are provided through the base plate 70, which run vertically to the base plane. In the exemplary embodiment shown, a moisture sensor 72 is arranged in one of these holes. The moisture sensor 72 is further configured to determine whether the surface of the base plate 70 is moist. The moisture sensor 72 is adapted to transmit sensor data to a gateway device, such as the gateway device 51.

In addition to the holes vertical to the ground level 2, the base plate 70 has longitudinal holes 71 which run parallel to the ground level and have a diameter of approx. ⅔ of the height of the base plate 70. On the one hand, cables can be laid through these longitudinal holes 71 and, on the other hand, wastewater can be conducted.

Below the base plate 70, a drain body 10 is arranged which essentially corresponds to the drain body 10 of FIGS. 1 and 2. The drain body 10 of FIG. 3 has a temperature sensor 11 and a salinity sensor 12. The temperature sensor 11 is releasably attached to the underside of the drain ceiling element 16, for example using a clip connection. The salinity sensor 12 is detachably attached to the upper side of a drain floor element 16', in particular using a clip connection.

LIST OF REFERENCE NUMERALS

1 Drainage system
2 Ground level
3 Vegetation/Tree
4 Wastewater pipe
5, 5', 5" Connecting pipe
6, 6', 6" Flow sensor
7 Moisture sensor
8 Backwater valve
9 Base plate
10 Drain body
11, 11' Temperature sensor
12 Salinity sensor
13 Drain maintenance access
14 Sediment sensor
15 Drain wall element
16, 16' Drain ceiling element/drain floor element
17 Lower drain element
18 Upper drain element
19 Spacer element
20 Rainwater collection pipe
21 Rain gutter
30 Collecting device
31, 31' Temperature sensor
32 Salinity sensor
33 Water-level sensor
34 Backwater valve
35 Soil moistening unit
40 Drain body
41 Temperature sensor
42 Salinity sensor
43 Drain maintenance access
44 Sediment sensor
45 Water-level sensor
50 Antenna mast
51 Gateway
52 Antenna
53 Water quantity sensor
60 Server
61 Mobile terminal device
70 Base plate
71 Longitudinal hole
72 Moisture sensor

The invention claimed is:
1. A drainage system, comprising:
at least one infiltration device adapted to receive fluid;
a collecting device which is connected to the at least one infiltration device by a first connecting pipe and is adapted to receive the fluid from the at least one infiltration device and to discharge the fluid to a fluid system by a second connecting pipe,
wherein a gateway device, which is adapted to receive sensor data and transmit the sensor data to a receiving unit; and
at least one sensor communicatively connected to the gateway device, for outputting the sensor data;

wherein the at least one sensor is designed as a sediment sensor for detecting deposits in the at least one infiltration device wherein the sediment sensor is arranged in an access shaft of the at least one infiltration device; and wherein the at least one infiltration device has a first temperature sensor and the collecting device has a second temperature sensor.

2. The drainage system according to claim 1, wherein the at least one sensor is adapted to determine or output the sensor data at a substantially constant frequency.

3. The drainage system according to claim 2, wherein the at least one sensor is adapted to switch between an idle phase and an active phase, wherein the determining or outputting the sensor data is performed only in the active phase.

4. The drainage system according to claim 1, wherein the at least one sensor is arranged in the at least one infiltration device or in the collecting device.

5. The drainage system according to claim 1, wherein the at least one infiltration device and the collecting device are arranged at different depth levels with respect to a ground level.

6. The drainage system according to claim 1, further comprising at least one backwater valve is in the collecting device or in the fluid system, for blocking backwatering fluid.

7. The drainage system according to claim 1, further comprising at least one drainage device for draining surface water or rainwater, which is in fluid communication with the at least one infiltration device.

8. The drainage system according to claim 7, wherein the at least one drainage device is a water-permeable base plate or a drainage element, wherein the base plate or the drainage element is adapted to accommodate at least one sensor on a surface facing away from the ground.

9. The drainage system according to claim 8, wherein the base plate comprises a sensor receptacle with a through-hole for accommodating the at least one sensor.

10. The drainage system according to claim 1, further comprising a server device which is communicatively connected to the gateway device and adapted to receive the sensor data.

11. The drainage system according to claim 10, wherein the server device comprises a computing device adapted to parameterize a simulation model using the sensor data or to learn a simulation model.

12. The drainage system according to claim 11, wherein the simulation model specifies a water level in the at least one infiltration device or in the collecting device as a function of a quantity of introduced fluid.

13. The drainage system according to claim 1, wherein the at least one infiltration device has a third temperature sensor, the first temperature sensor and the third temperature sensor being arranged at different heights on a side wall of the at least one infiltration device.

14. The drainage system according to claim 1, wherein the collecting device has a fourth temperature sensor, the second temperature sensor and the fourth temperature sensor being arranged at different heights on a side wall of the collecting device.

15. A drain for use in athelh drainage system,
the drainage system comprising:
at least one infiltration device adapted to receive fluid;
a collecting device which is connected to the at least one infiltration device by a first connecting pipe and is adapted to receive the fluid from the at least one infiltration device and to discharge the fluid to a fluid system by a second connecting pipe,
wherein a gateway device, which is adapted to receive sensor data and transmit the sensor data to a receiving unit and
at least one sensor communicatively connected to the gateway device, for outputting the sensor data;
wherein the at least one sensor is designed as a sediment sensor for detecting deposits in the at least one infiltration device; wherein the sediment sensor is arranged in an access shaft of the at least one infiltration device; and and
wherein the at least one infiltration device has a first temperature sensor and the collecting device has a second temperature sensor;
the drain comprising:
a lower drain element;
an upper drain element;
spacer elements by means of which the lower and the upper drain elements can be connected to one another;
wherein the at least one sensor is arranged on the lower or on the upper drain element for outputting the sensor data.

* * * * *